United States Patent
Couwenhoven et al.

(10) Patent No.: US 8,085,436 B2
(45) Date of Patent: Dec. 27, 2011

(54) DIGITAL PRINTING USING SIMILAR COLORANTS

(75) Inventors: Douglas W. Couwenhoven, Fairport, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 501 days.

(21) Appl. No.: 12/330,552

(22) Filed: Dec. 9, 2008

(65) Prior Publication Data

US 2010/0141970 A1    Jun. 10, 2010

(51) Int. Cl.
- *H04N 1/60* (2006.01)
- *H04N 1/40* (2006.01)
- *H04N 1/46* (2006.01)
- *G03F 3/08* (2006.01)
- *G06K 9/00* (2006.01)

(52) U.S. Cl. ........ 358/1.9; 358/3.23; 358/518; 358/535; 382/162; 382/167

(58) Field of Classification Search ............. 358/1.9, 358/3.23, 518, 535; 382/162, 167
See application file for complete search history.

(56) References Cited

U.S. PATENT DOCUMENTS

| | | | |
|---|---|---|---|
| 4,635,078 A | 1/1987 | Sakurada et al. | |
| 4,672,432 A | 6/1987 | Sakurada et al. | |
| 4,727,436 A | 2/1988 | Kawamura et al. | |
| 5,142,374 A | 8/1992 | Tajika et al. | |
| 5,528,377 A * | 6/1996 | Hutcheson | 358/1.9 |
| 5,729,259 A | 3/1998 | Gotoh et al. | |
| 6,268,931 B1 | 7/2001 | Yamada et al. | |
| 6,283,203 B1 | 9/2001 | Eilertsen | |
| 6,312,101 B1 | 11/2001 | Couwenhoven et al. | |
| 7,057,756 B2 * | 6/2006 | Ogasahara et al. | 358/1.15 |
| 7,262,882 B2 | 8/2007 | Hagai et al. | |
| 7,354,126 B2 * | 4/2008 | Tatsumi | 347/15 |

\* cited by examiner

Primary Examiner — Charlotte M Baker
(74) Attorney, Agent, or Firm — Raymond L. Owens

(57) ABSTRACT

A method for printing an input digital image using a digital printer having a set of colorants with substantially the same color but different densities, including a sequence of node points where each of the two or more colorants are either at their maximum or minimum values, setting colorant concentrations such that the color channel output responses corresponding to the sequence of node points are substantially equally spaced in a visually uniform color space; forming colorant control look-up tables to provide smooth transitions in the color channel output response between the sequence of node points; addressing the colorant control look-up tables with the printer code value for each pixel of the input digital image to determine the colorant control signals for each of the two or more colorants; and controlling the digital printer using the colorant control signals to produce a print of the input digital image.

15 Claims, 10 Drawing Sheets

DIGITAL PRINTING USING SIMILAR COLORANTS

FIELD OF THE INVENTION

This invention pertains to the field of digital printing, and more particularly to digital printers having multiple colorants having the same color but different densities.

BACKGROUND OF THE INVENTION

In the field of digital printing, a digital printer receives digital image data from a computer and places colorant on a receiver to reproduce the image. A digital printer can use a variety of different technologies to transfer colorant to the page. Some common types of digital printers include inkjet, thermal dye transfer, thermal wax, electrophotographic, and silver halide printers.

It is a common goal in the field of digital printing to continually improve the quality of the output print, particularly when printing digital images of photographs. In recent years, advances in the technology related to digital printing have provided much opportunity for improving the quality of the output, particularly in the field of inkjet printing. An inkjet printer reproduces an image by ejecting small drops of ink from a printhead containing nozzles, where the ink drops land on a receiver medium (typically paper) to form ink dots. A typical inkjet printer reproduces a color image by using a set of color inks, usually cyan, magenta, yellow, and black. Often, the dots produced by the inkjet printer are visible to the human eye, and result in an undesirable noise or "grainy" appearance to the reproduced image. Modern inkjet printers typically reproduce images using smaller ink drops than their predecessors, thus reducing the visibility of the ink dots and therefore improving the image quality. Another technique employed by some modern inkjet printers to reduce the grainy appearance of reproduced images is to use multiple inks of the same color, but different densities, such as a light cyan and a dark cyan ink. The light ink dots are less visible to the human eye than the dark ink dots, and regions of the image reproduced with the light ink will appear less grainy than if a dark ink had been used to reproduce the same region.

A number of different methods have been disclosed in the prior art for controlling the usage of the light and dark inks. For example, U.S. Pat. No. 4,635,078 discloses a inkjet printing system using a light ink and a dark ink. Dot patterns of the light ink are used to print light colors and dot patterns of the dark ink are used to print dark colors. A transition region is described for intermediate density levels where some light dots and some dark dots are printed.

U.S. Pat. No. 4,672,432 discloses another inkjet printing system using a light ink and a dark ink. Dot patterns are defined for a series of tone levels, where when there is more than one combination of colorants that can represent a given density, the combination having the largest number of drops is selected to minimize image graininess.

U.S. Pat. No. 4,727,436 discloses a system for printing an image with low and high density inks. The low density ink is used in a low density dot reproduction range, and the high density ink is used in a high density dot reproduction range. The transition between using the two inks is conducted where the picture density sharply changes.

Another common approach analogous to that disclosed in U.S. Pat. No. 5,142,374 is shown in FIG. 1. In this case, a single input printer code value I(x,y) is used to control all of the inks of a certain color at a given x-y location in the image. Consider the case of an inkjet printer having dark cyan (C) and light cyan (c) inks. With this approach, the dark cyan and light cyan inks would be controlled by a single cyan printer code value. A set of colorant control look-up tables 10 are provided to determine the amounts of the light and dark colorants as a function of the input printer code value I(x,y). The set of colorant control look-up tables 10 are sometimes referred to using terms such as "split LUTs" or "separation tables" or "ink manifolds." In this example, the set of colorant control look-up tables 10 includes a light colorant control look-up table 11 and a dark colorant control look-up table 12, which are used to determine a light colorant control signal $C_L(x,y)$ and a dark colorant control signal $C_D(x,y)$, respectively. Next, halftoning operations are applied to determine the pattern of drops that should be printed given the colorant control signals. A halftone light colorant step 13 is used to process the light colorant control signal $C_L(x,y)$ to determine a light ink halftone signal $H_L(x,y)$. Similarly, a halftone dark colorant step 14 is used to process the dark colorant control signal $C_D(x,y)$ to determine a dark ink halftone signal $H_D(x,y)$. In many inkjet printing systems, the halftone signals will be binary where a "0" indicates that no ink drop should be printed at that x-y location and a "1" indicates that a single ink drop should be printed at that x-y location. Common halftoning methods that are used in many inkjet printers include the well-known error diffusion and blue-noise dither algorithms. The light ink halftone signal $H_L(x,y)$ is then used by a print light colorant step 15 to place the desired arrangement of light ink drops onto the paper. Likewise, the dark ink halftone signal $H_D(x,y)$ is then used by a print dark colorant step 16 to place the desired arrangement of dark ink drops onto the paper.

In some inkjet printing systems, more than two output levels can be produced. For example, it may be possible to print ink drops having a range of drop sizes, or to print multiple ink drops at a particular x-y position by using multiple passes of the print head over the paper. In such cases, the halftone steps can be adapted to output more than two output levels. Halftone algorithms that can produce more than two output levels are sometimes referred to as multi-level halftoning algorithms, or simply as multitoning algorithms.

Various configurations have been suggested for the form of the light colorant control look-up table 11 and the dark colorant control look-up table 12. For example, FIG. 2 illustrates a set of colorant control LUTs similar to those disclosed in FIG. 3 of U.S. Pat. No. 5,142,374. Two curves are given showing the relationship between the input printer code value and the corresponding colorant control signals for the two inks. A light colorant control look-up table 20 is used to control the light ink and a dark colorant control look-up table 21 is used to control the dark ink. It can be seen that as the input printer code value is increased, the colorant control signal for the light ink linearly increases until it reaches its maximum level. At this point the colorant control signal for the dark ink starts to increase while the colorant control signal for the light ink is decreased. At the maximum input printer code value, the colorant control signal for the dark ink is at its maximum level, while the colorant control signal for the light ink is at its minimum level. Similar configurations can be found in many prior art inkjet printing systems such as those disclosed in U.S. Pat. Nos. 5,729,259, 6,268,931 and 7,057,756.

A number of other configurations for the set of colorant control LUTs 10 have also been suggested in the prior art. For example, FIG. 3 shows an arrangement similar to that shown in FIG. 31 of U.S. Pat. No. 6,283,203. In this case, the dark colorant control look-up table 31 is similar to the dark colorant control look-up table 21 given in FIG. 2. However, a different form is used for the light colorant control look-up table 30 where the colorant control signal for the light ink stays at its maximum level rather than decreasing as the colorant control signal for the dark ink is increased.

U.S. Pat. No. 6,268,931 discloses a configuration where the low density ink amount is limited to a value which for each color would result in no more than fifty percent of the dots in the final halftone pattern being low density ink dots. U.S. Pat. No. 7,057,756 discloses a configuration where a higher level of light ink is used (e.g., 200%) so that the use of dark ink can be delayed to a higher gradation level. U.S. Pat. No. 6,312,101 discloses a method to create a set of colorant control LUTs by minimizing a cost function. This permits the system designer to trade off various attributes such as granularity, total ink volume and relative ink usage.

While most prior art configurations utilizing light inks describe systems having two inks of the same color (e.g., light and dark cyan), the basic approach can easily be generalized to systems having more than two inks of the same color. For example, U.S. Pat. No. 5,142,374 describes a configuration having a light ink, a medium ink and a dark ink. Increasing the number of different ink densities for a given color has the advantage that lower granularity levels can be obtained at the expense of additional system cost and complexity. Therefore, such configurations are typically limited to applications where image quality is a high priority. FIG. 4 shows a generalization of the prior art configuration given in FIG. 1 for the case where 5 inks of substantially the same color but different densities are used. In this configuration, a set of colorant control look-up tables 40 are provided to determine the amounts of the 5 colorants as a function of the input printer code value I(x,y). The set of colorant control look-up tables 40 includes colorant control look-up tables 42 for each of the individual colorants, which are addressed by the input printer code value I(x,y). The output of the colorant control look-up tables 42 are the colorant control signals $C_N(xy)$ for each of the colorants, where N indicates the colorant number. Halftoning operations 44 are applied to the colorant control signals $C_N(xy)$ to determine halftone signals $H_N(x,y)$ for each of the colorants. Print colorant steps 46 are then used to print the halftone signals $H_N(x,y)$ for each of the colorants.

FIG. 5 shows a set of colorant control look-up tables that can be used in accordance with the five-ink configuration shown in FIG. 4. It can be seen that this is a generalization of the two-colorant control look-up tables shown in FIG. 3. This arrangement limits the total ink usage to a maximum of 200% of the maximum ink amount for any individual ink. A first colorant control look-up table 51 is used to control the lightest colorant. As with FIG. 3, the colorant control signal for the lightest colorant increases linearly to its maximum level and stays there while the second colorant is linearly increased. However, in this case, once a second colorant control look-up table 52 reaches its maximum level, the first colorant control look-up table 51 is decreased as a third colorant control look-up table 53 is linearly increased. This pattern is repeated for a fourth colorant control look-up table 54 and a fifth colorant control look-up table 55.

U.S. Pat. Nos. 5,142,374 and 6,268,931 have suggested that for a two-ink configuration, the density produced by full coverage of the light ink should be one half of the density produced by full coverage of the dark ink. For configurations with more than two inks of the same color, this principal can be generalized such that the colorant concentrations for the set of inks are selected so that the optical densities of the individual inks are equally spaced.

For any given ink, it is generally found that there is a non-linear relationship between the resulting density and the colorant control signal for that ink. The exact form of these nonlinearities will depend on a number of different factors such as the inkjet printing configuration (which includes parameters such as drop size(s), maximum number of ink drops, number of printing passes), the type of halftoning, and the characteristics of the ink and the receiver. A representative set of tone scale curves are shown in FIG. 6 for a five-ink system where the optical densities for full coverage of the individual inks are equally spaced. A first tone scale curve 61 shows the density vs. colorant control signal relationship for the lightest ink. Similarly, tone scale curves 62 through 65 show the density vs. colorant control signal relationships for the other four inks.

Several problems that can arise in the prior art arrangements are illustrated in FIG. 7. This figure shows an example composite tone scale function 70 that can result from the conventional five-ink configuration like that shown in FIG. 4 using the conventional set of colorant control look-up tables shown in FIG. 5. The composite tone scale function 70 in FIG. 7 shows the relationship between the input printer code value and the resulting "lightness" of the printed image. (The composite tone scale function 70 was determined using a model of an inkjet system using a set of five gray inks that were equally spaced in optical density.) The lightness in this plot is the L* value of the well-known CIELAB color space, which is intended to be an approximate representation of the response of the human visual system.

The solid circles plotted on the composite tone scale function 70 correspond to a series of node points where each of the inks are at either their maximum or minimum colorant amounts. These points correspond to the input printer code values in FIG. 5 where there are sharp corners in the colorant control LUTs. The first node point at an input printer code value of 0 corresponds to no ink being applied; the second node point at an input printer code value of 52 corresponds to the maximum amount of the lightest ink and none of the other inks; and the third node point at an input printer code value of 102 corresponds to maximum amounts of the first and second inks and none of the other inks. For the other three node points, two of the inks are at their maximum levels, and the other three inks are at their minimum levels.

One undesirable characteristic of the composite tone scale function 70 is that it is highly nonlinear, and consequently most of the lightness change happens in the first half of the input printer code value range. This largely results from the fact that there is not a simple additive relationship when multiple inks are combined, together with the fact that there is a nonlinear relationship between optical density and L*. This nonlinear shape can complicate the design of the calibration and color management operations in an inkjet printing system since conventional approaches typically don't work well when the output response does not vary significantly over some range of input printer code values.

A more serious problem with the composite tone scale function 70 is the fact that it is not smooth, having a series of serrations between the node points. These serrations are prone to produce contouring artifacts and create further complications for the design of the calibration and color management operations. This problem is particularly troublesome if the serrations grow large enough so that the composite tone scale function becomes non-monotonic.

U.S. Pat. No. 7,262,882 recognizes the problems associated with a nonlinear tone scale response, and suggests that a "linearly-changing" density curve can be achieved by modifying a conventional set of colorant control look-up tables like those shown in FIG. 2. This is accomplished by re-sampling the input printer code value axis at a series of points corresponding to equally-spaced density values. However, this approach has the serious limitation that it does not work for cases where the composite tone scale function has flat spots or non-monotonicities.

SUMMARY OF THE INVENTION

It is an object of the present invention to determine a set of colorant concentrations and a set of colorant control look-up tables that can be used in a digital printing system using a set of similar colorants having the same color but different densities. It is another object of the present invention to provide a digital printing system where the output response in a visually uniform color space is approximately linear with the input printer code value. It is yet another object of the present invention to provide a digital printing system where the output response varies smoothly with the input printer code value, having no serrations in the output response.

These objects are achieved by a method for printing an input digital image having at least one color channel using a digital printer having a set of colorants, wherein two or more of the colorants in the set have substantially the same color but different densities, and printer code values for a corresponding color channel are used to control colorant amounts for the two or more colorants producing a corresponding color channel output response, comprising:

(a) defining a sequence of node points where each of the two or more colorants are either at or near their maximum or minimum values, and where at least two colorants are at or near their maximum values for at least one of the nodes;

(b) setting colorant concentrations for each of the two or more colorants such that the color channel output responses corresponding to the sequence of node points are substantially equally spaced in a visually uniform color space;

(c) forming colorant control look-up tables for each of the two or more colorants, the colorant control look-up tables providing colorant control signals for controlling each of the two or more colorants as a function of the printer code value for the particular color channel, wherein the colorant control look-up tables define a nonlinear relationship between the printer code value for the particular color channel and the colorant control signals between the node points in order to provide smooth transitions in the color channel output response between the sequence of node points;

(d) addressing the colorant control look-up tables with the printer code value for the particular color channel for each pixel of the digital image to determine the colorant control signals for each of the two or more colorants; and (e) controlling the digital printer using the colorant control signals for each of the two or more colorants to specify the colorant amounts for each of the two or more colorants producing a print of the input digital image.

The present invention has the advantage that a digital printing system using a set of similar colorants having the same color but different densities is provided where the output response tone scale in a visually uniform color space is approximately linear with the input printer code value. The present invention has the additional advantage that the output response varies smoothly with the input printer code value, having no serrations or non-monotonicities in the output response tone scale. An advantage of digital printing systems having these characteristics is that they are better behaved for purposes of calibration and color management. Another advantage of systems having these characteristics is that they avoid contouring artifacts that can be associated with output response tone scales having serrations or non-monotonicities.

DETAILED DESCRIPTION OF THE INVENTION

Figure 7:
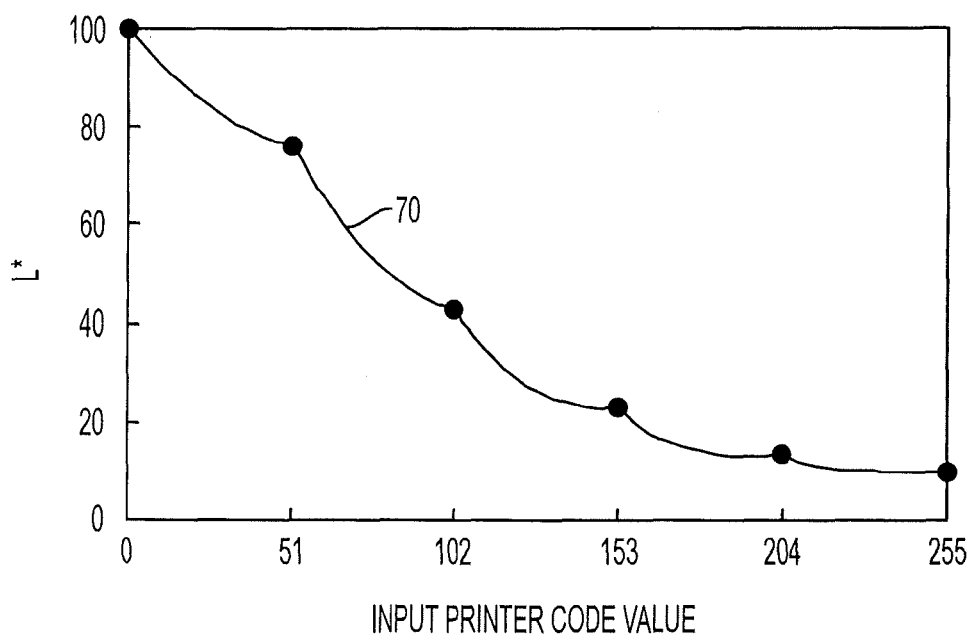
FIG. 7 shows a typical composite tone scale function for an inkjet printer using five inks having different densities.

The present invention represents a method for printing an input digital image on a digital printer having a set of colorants, wherein the set of colorants includes at least one set of similar colorants including two or more of the colorants having substantially the same color but different densities. In a preferred embodiment of the present invention, the printer is an inkjet printer. However, it will be recognized that the same method could be applied to other types of printers as well. The present invention overcomes the disadvantages of the prior art configurations that were discussed above with reference to FIG. 7 using a process that includes setting the colorant concentrations for the two or more colorants, together with a novel method for forming colorant control look-up tables to provide a smooth output response. The method described herein can be applied to each set of similar colorants used in a particular printer. For example an inkjet printer can have a set of light, medium and dark cyan inks, together with a set of light, medium and dark magenta inks, and a set of light, medium and dark neutral (gray) inks. In this case, the method of the present invention can be applied to each of the sets of similar colorants separately. It will be assumed that each set of similar colorants will be associated with an input printer code value for a corresponding input color channel. The input printer code value is used to control colorant amounts for each of the two or more colorants in the corresponding set of similar colorants, and will produce a corresponding color channel output response. In a preferred embodiment of the present invention, the color channel output response is characterized using a visually uniform color space such as the well-known CIELAB color space. Alternatively, other metrics such as optical density could also be used to characterize the color channel output response.

The remainder of this disclosure will focus on applying the method of the present invention for a single set of similar colorants including five neutral (gray) colorants having substantially the same color but different densities. However, it will be recognized that the present invention can be applied to digital printers having different numbers of similar colorants. It will also be recognized that it can be applied to digital printers having multiple sets of similar colorants, in which case the method of the present invention can be applied to each set of similar colorants.

Figure 5:
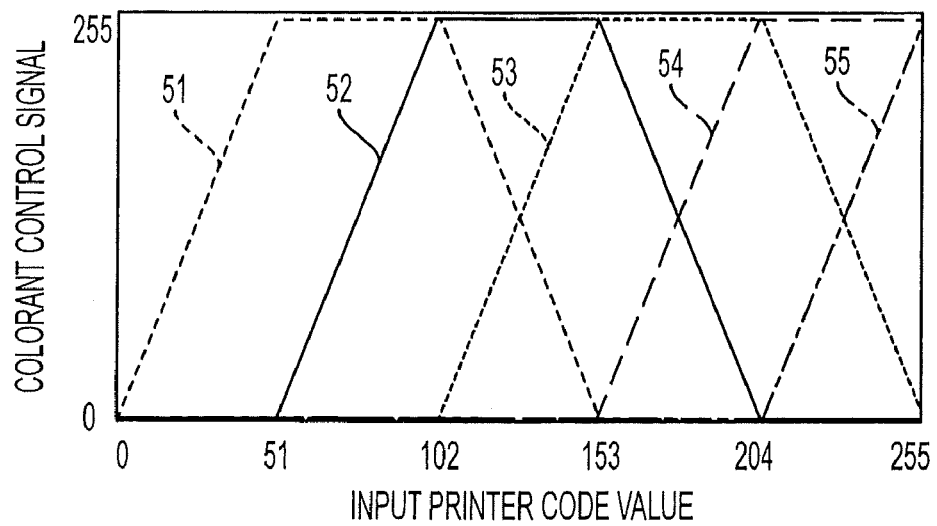
FIG. 5 shows a set of colorant control look-up tables for a printer using five different density inks.
Figure 6:
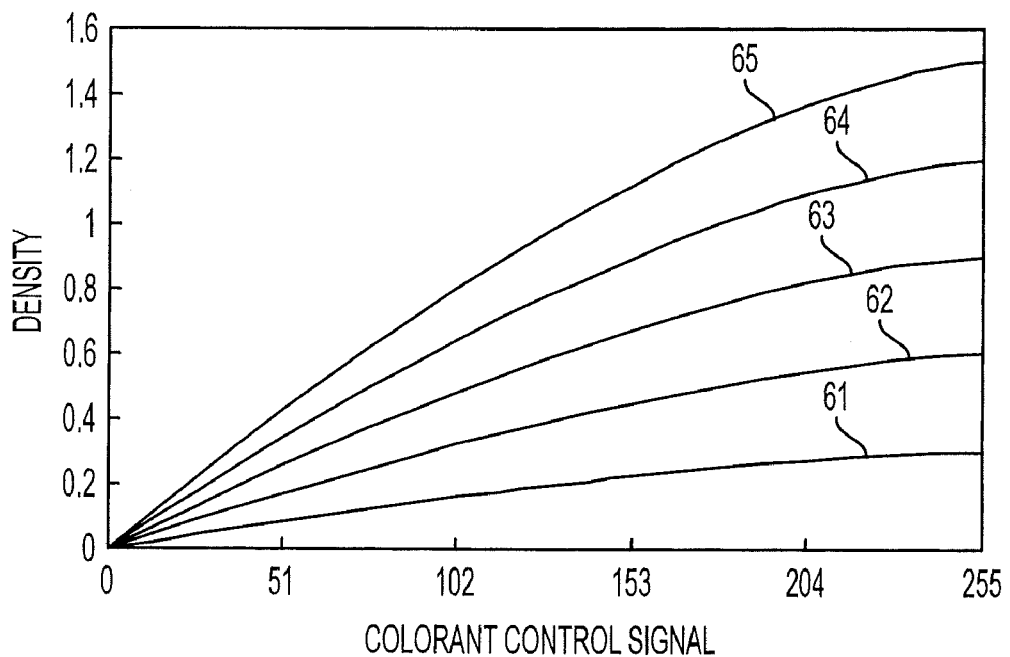
FIG. 6 shows a typical set of tone scale functions for five inks that are equally spaced in density.
Figure 8:
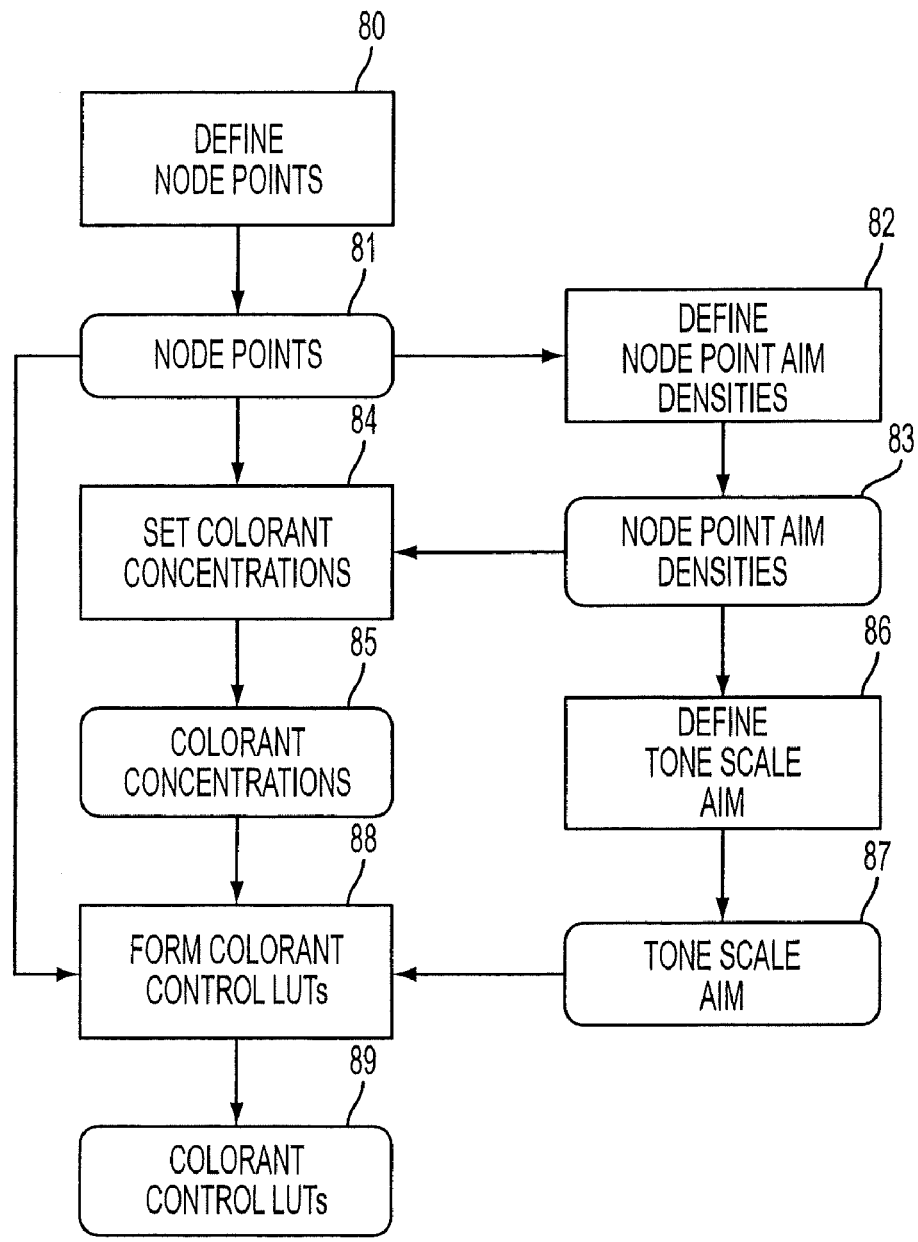
FIG. 8 shows a flow chart illustrating the method of the present invention.

A preferred embodiment of the present invention will now be described with reference to the flowchart shown in FIG. 8. First, a define node points step 80 is used to define a sequence of node points 81, where at each node point each of the two or more colorants are either at or near their maximum or minimum values. By near maximum it is meant that the colorant level is within 10% of the maximum colorant level used in the colorant control look-up table. By near minimum it is meant that the colorant level is within 10% of the minimum colorant level used in the colorant control look-up table. Considering the case where a digital printer uses a set of five similar colorants, an example sequence of node points that can be used in accordance with the present invention is given in Table 1. In this example, the colorant control values are assumed to be 8-bit integers so that the minimum colorant amount corresponds to a colorant control value of 0, and the maximum colorant amount corresponds to a colorant control value of 255. It can be seen that this sequence of node points corresponds to those used for the set of colorant control look-up tables in FIG. 5.

TABLE 1

Example sequence of node points

| Node Point | Colorant 1 | Colorant 2 | Colorant3 | Colorant 4 | Colorant 5 |
|---|---|---|---|---|---|
| 1 | 0 | 0 | 0 | 0 | 0 |
| 2 | 255 | 0 | 0 | 0 | 0 |
| 3 | 255 | 255 | 0 | 0 | 0 |
| 4 | 0 | 255 | 255 | 0 | 0 |
| 5 | 0 | 0 | 255 | 255 | 0 |
| 6 | 0 | 0 | 0 | 255 | 255 |

The pattern of node points shown in Table 1 represent one preferred embodiment of the present invention where the two or more colorants are at their minimum levels for the first node, a first colorant is at its maximum level and all other colorants in the set of two or more colorants are at their minimum levels for a second node, the first colorant and a second colorant are at their maximum levels and any other colorants in the set of two or more colorants are at their minimum levels for a third node, and any other nodes have two colorants at their maximum level and any other colorants in the set of two or more colorants are at their minimum levels.

Next a define node point aim densities step 82 is used to define a set of node point aim densities 83. In a preferred embodiment of the present invention, the node point aim densities 83 will correspond to points that are substantially equally spaced in a visually uniform color space. By substantially equally spaced it is meant that the spacings between the points in the visually uniform color space are equal or within 10%. One common visually uniform color space that can be used according to the method invention is the well-known CIELAB color space. In one embodiment of the present invention, the node point aim densities are defined to be equally space in either CIELAB L* or CIELAB C* values. Alternatively, any number of other visually uniform color spaces could also be used. Optical density can also be used as an adequate approximation to a visually uniform color space for many applications. In this case, the node point aim densities can be defined to be substantially equally spaced in optical density.

Table 2 shows an example set of node point aim densities for the set of nodes given in Table 1. Here it has been assumed that the set of five similar inks are gray inks of different densities, and that the printer is capable of producing a L* range of 10 to 100 (where 100 corresponds to the paper white). In order for the six nodes to be equally spaced in lightness, the lightness interval between nodes should be 18 L* units. It should be noted that it is not necessary for the lightness intervals to be exactly constant, although this arrangement will be assumed for the examples described here. In practice, the node spacing can be somewhat non-uniform.

Once the L* aim values are determined for each node point, the corresponding node point aim densities can be determined using well-known relationships between L* and optical density. The optical density values shown in the table are visual density values. (The visual density of the paper has been subtracted so that the first node has a visual density of 0.0.) It can be seen that even though the nodes are equally space in L*, the corresponding node point aim densities are not equally spaced, reflecting the fact that density values are only approximately visually uniform.

TABLE 2

Example node point aim densities

| Node Point | L* | Visual Density |
|---|---|---|
| 1 | 100 | 0.00 |
| 2 | 82 | 0.22 |
| 3 | 64 | 0.48 |
| 4 | 46 | 0.82 |
| 5 | 28 | 1.26 |
| 6 | 10 | 1.95 |

Figure 1:
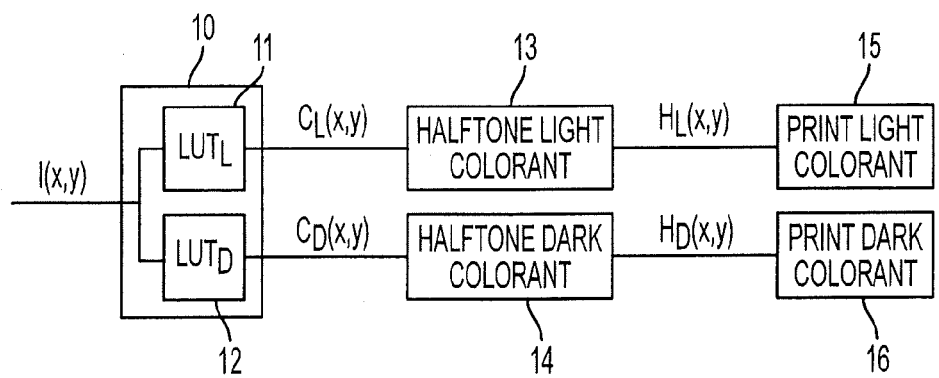
FIG. 1 is flow chart of a prior art arrangement for printing with light and dark inks.
Figure 2:
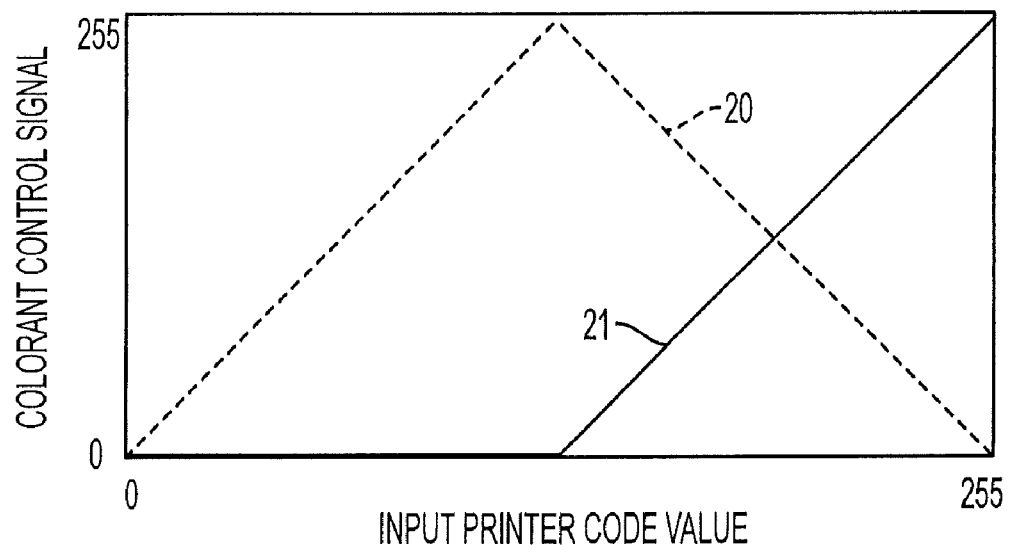
FIG. 2 shows a set of colorant control look-up tables for a printer using light and dark inks.
Figure 3:
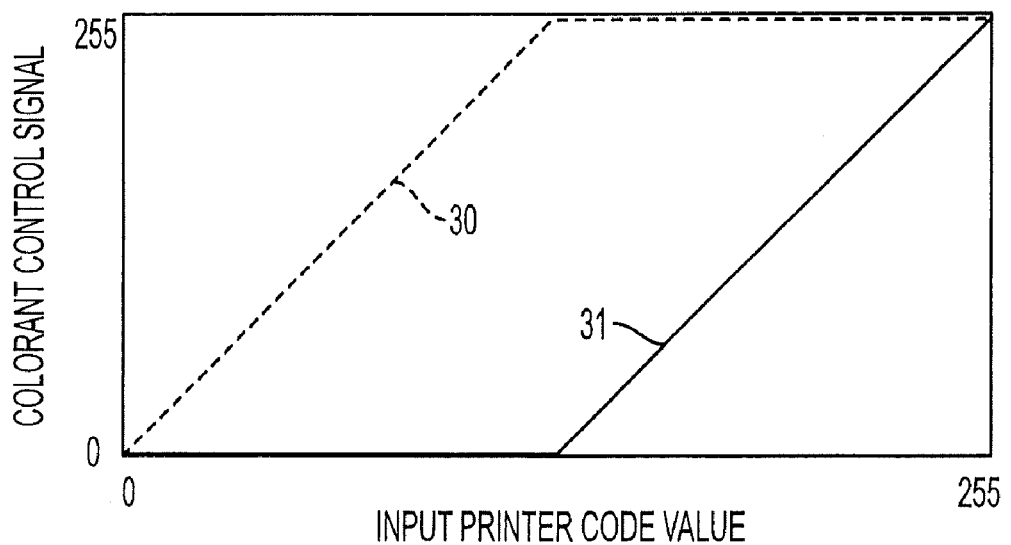
FIG. 3 shows another set of colorant control look-up tables for a printer using light and dark inks.

Returning now to FIG. 8, a set colorant concentrations step 84 is now used to determine the colorant concentrations 85 for each of the two or more colorants responsive to the node points 81 and the node point aim densities 83. If a set of node points 81 us defined where only one colorant is used at each node point (as was the case in the FIG. 2 configuration), the process of determining the colorant concentrations 85 is relatively straightforward since there will be a simple relationship between colorant concentration and the resulting optical density. However, this process is more complex for cases where multiple colorants are used for some of the node points.

Consider the node points given in Table 1. The colorant concentration for ink 1 can be set directly by determining the colorant concentration needed to produce the aim density for node point 1 since that is the only colorant used at this node. However, the process for determining the colorant concentrations for the other nodes is not as straightforward. For example, the colorant concentration for colorant 2 must be determined such that when colorant 1 and colorant 2 are printed at their maximum levels, the aim density for node 2 is achieved. Due to the complex ink/media/printer interactions, it is typically necessary to prepare colorants having a series of different colorant concentrations and print them in an actual printer. The appropriate colorant concentration can be determined by iteratively adjusting the colorant concentration, or by interpolating between a set of known colorant concentrations. If an accurate enough model of the printing system can be developed, the model can be used to determine good approximations for the colorant concentrations.

Table 3 shows aim density values for individual inks that would produce the node point aim densities given in Table 2. These values were determined using a model that was developed for a particular inkjet printing system. These individual ink aim density values correspond to the density that would be produced if the given ink were printed at its maximum value and no other inks were used. The colorant concentrations needed to produce these individual ink aim density values would generally be specified in terms of the amount of a dye or pigment that is added to a given volume of ink. These values are generally determined experimentally by varying the colorant concentration and measuring the corresponding density value when the colorant is printed using a particular printer and media.

TABLE 3

Individual ink aim densities

| Ink | Visual Density |
|---|---|
| 1 | 0.22 |
| 2 | 0.27 |
| 3 | 0.56 |
| 4 | 0.75 |
| 5 | 1.76 |

It is interesting to note that the individual ink aim densities given in Table 3 are very non-uniformly spaced in density. This is quite contrary to the conventional wisdom found in the most of the prior art. In particular, it can be seen that the difference in density (and therefore colorant concentration) for inks 1 and 2 is very small, and almost negligible, whereas the density difference between inks 4 and 5 is more than 5× larger than any of the other density differences.

Figure 9:
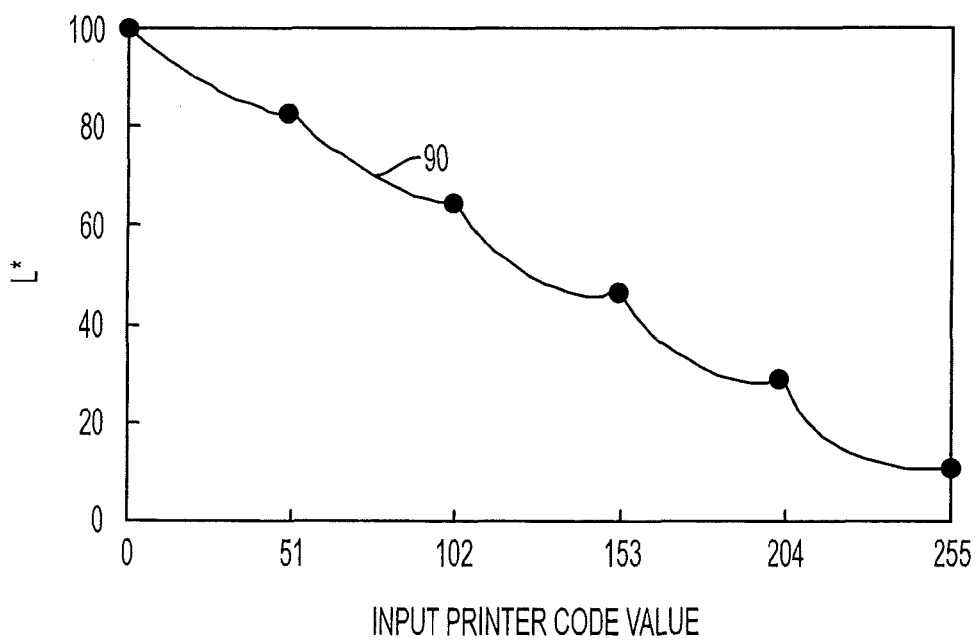
FIG. 9 shows a composite tone scale function for the case where the colorant concentrations are selected according to the method of the present invention.

It should be noted that simply setting the colorant concentrations according to the method of the present invention is generally not sufficient to insure that a desirable tone scale response is achieved. For example, if the colorant concentrations corresponding to the individual ink aim densities of Table 3 are used together with the conventional colorant control look-up tables shown in FIG. 5, a composite tone scale 90 shown in FIG. 9 results. It can be seen that the node points are now arranged linearly as would be expected. However, the composite tone scale 90 still contains a series of sharp serrations. As mentioned earlier, these serrations are very undesirable characteristics when a system designer attempts to calibrate and color manage a digital printing system. In this case, the serrations in the composite tone scale 90 are severe enough to introduce non-monotonicities, which are particularly troublesome to deal with.

Returning again to FIG. 8, according to the method of the present invention a define tone scale aim step 86 is next used to define a tone scale aim 87. The tone scale aim 87 is formed by providing smooth transitions between the color channel output responses at the node points. In a preferred embodiment of the present inventions, the node points are uniformly spaced in CIELAB L*, and the tone scale aim 87 is defined by simply connecting the node points using straight lines, resulting in a linear relationship between the input printer code value and the resulting L* value. However, such a linear relationship is not necessary so long as the tone scale aim 87 represents a smooth relationship between the input printer code value and the resulting color channel output response.

One characteristic of a smooth tone scale aim is that the derivative of the color channel output response as a function of the input printer code value is continuous. For the special case where the derivative of the color channel output response as a function of the input printer code value is substantially constant, there will be a substantially linear relationship between the input printer code value and the color channel output response. By substantially constant it is meant that the derivative of the color channel output response as a function of the input printer code value is constant to within 10%.

Next a form colorant control look-up tables step 88 is used to form a set of colorant control look-up tables 89 responsive to the node points 81, the colorant concentrations 85 and the tone scale aim 87. The colorant control look-up tables 89 store the colorant control signals for each of the two or more related colorants as a function of the input printer code value for the corresponding color channel The colorant control look-up tables 89 connect the colorant control signals for the node points, providing smooth transitions in the color channel output response according to the tone scale aim 87. Typically, the colorant control look-up tables 89 will define a nonlinear relationship between the input printer code values and the colorant control values between each of the node points.

In a preferred embodiment of the present invention, the colorant control look-up tables 89 store the colorant control signals for each possible value of the input printer code value. Alternatively, the colorant control look-up tables 89 can also store the colorant control signals for a subset of the possible input printer code values. In this case, an interpolation process can be used to determine the colorant control signals for intermediate input printer code values.

Generally, there will be a complex relationship between the colorant control signals and the corresponding color channel output response. Therefore, it will typically be necessary to characterize the response of the digital printer by printing and measuring test patches or by developing sophisticated device models. After the response of the digital printer has been characterized, it is then necessary to select an appropriate set of colorant control signals that will produce the desired color channel output response for each input printer code value in the colorant control look-up tables 89. Generally, there will be multiple combinations of the colorant control values that will produce the desired color channel output response. There are various strategies that could be applied to select an appropriate combination. In a preferred embodiment of the present invention, the method of Couwenhoven et al. in U.S. Pat. No. 6,312,101 can be used to determine an optimal path through the colorant control value space that connect the node points. This method uses a cost function approach to determine the optimal colorant control values trading off attributes such as granularity and total ink volume. However, other strategies can also be used as well. For example, one simple strategy would be to select the colorant combinations that uses the minimum total ink volume.

Figure 10:
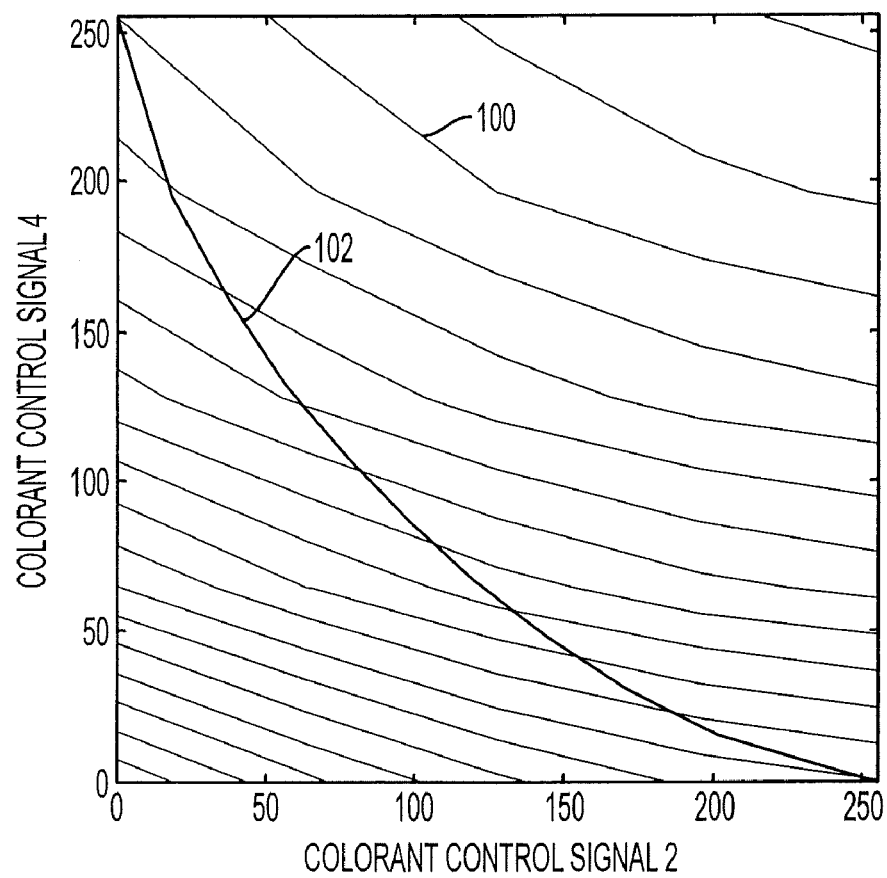
FIG. 10 shows a lightness contour plot that can be used in the process of determining colorant control look-up tables according to the method of the present invention.
Figure 11:
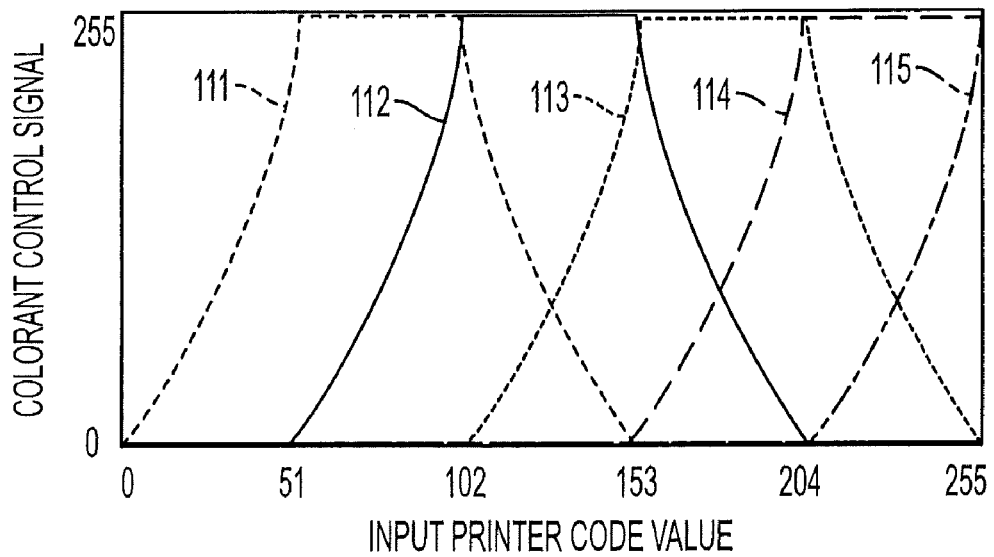
FIG. 11 shows a set of colorant control look-up tables created according to the method of the present invention.

An example illustrating how the colorant control look-up tables 89 could be formed for the interval between fourth and fifth nodes of Table 2 is shown in FIG. 10. In this interval, colorant 3 will be at its maximum value, colorant 2 will decrease from its maximum value at node 4 to its minimum value at node 5, and colorant 4 will increase from its minimum value at node 4 to its maximum value at node 5. The contour lines 100 show contours of constant color channel output response (L*) as a function of the colorant control signals for colorants 2 and 4. Node point 4 corresponds to the lower right corner of the graph, and node point 5 corresponds to the upper left corner of the graph. The conventional methods for defining the colorant control look-up tables 89 would simply connect these two node points with a straight line. Depending on the shape of the contours 100, this often results in serrations and sometimes non-monotonicities in the color channel output response as was discussed earlier. According to the method of the present invention, the colorant control look-up table formation process finds a path connecting these two node points that will achieve the tone scale aim 87. One such path that will achieve the tone scale aim 87 is a colorant control signal path 102. A complete set of colorant control look-up tables 89 can be formed by repeating this process for the intervals between each of the node points. An example set of colorant control look-up tables formed according to the method of the present invention is shown in FIG. 11. Five curves are plotted on this graph corresponding to the colorant control look-up tables for each of the five colorants. A first colorant control look-up table 111 corresponds to colorant 1; a second colorant control look-up table 112 corresponds to colorant 2; a third colorant control look-up table 113 corresponds to colorant 3; a fourth colorant control look-up table 114 corresponds to colorant 4; and a fifth colorant control look-up table 115 corresponds to colorant 5. Note that the node points are now connected with non-linear functions to achieve the desired smooth transition in the color channel output response rather than the conventional straight-line functions found in the prior art implementation shown in FIG. 5.

Figure 4:
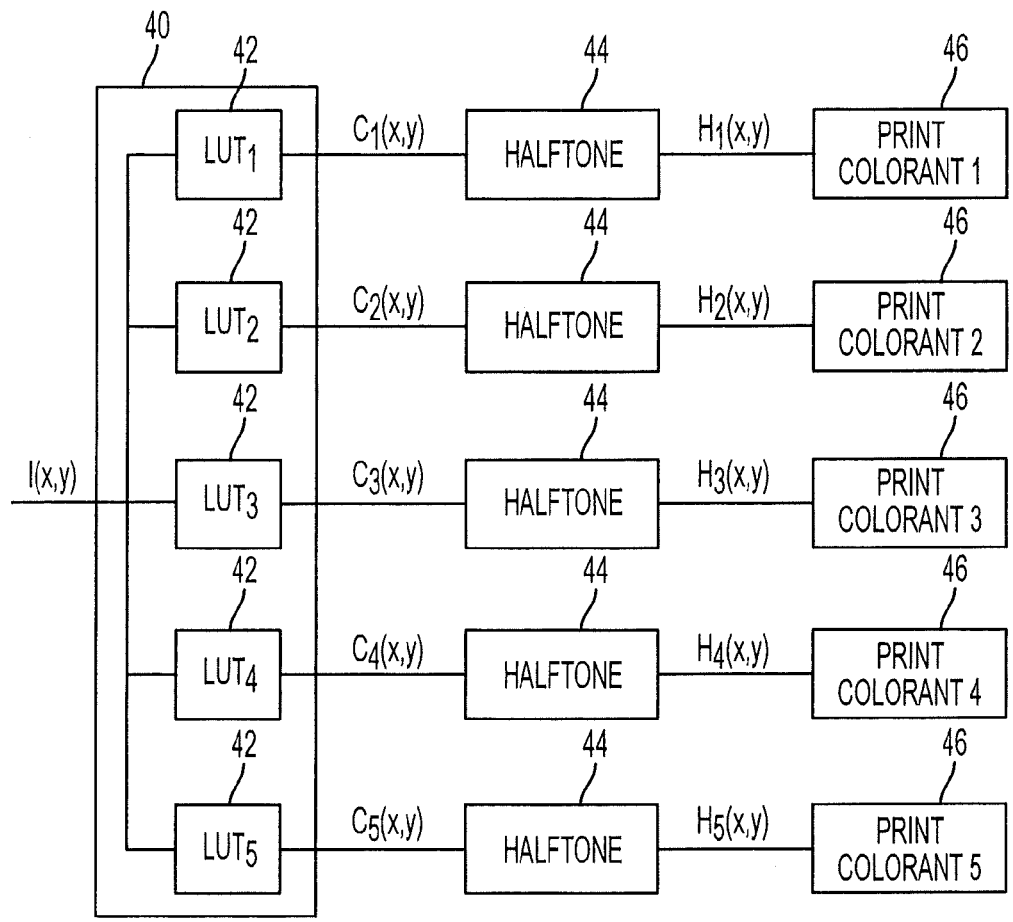
FIG. 4 is flow chart of a prior art arrangement for printing with a set of five different density inks.
Figure 12:
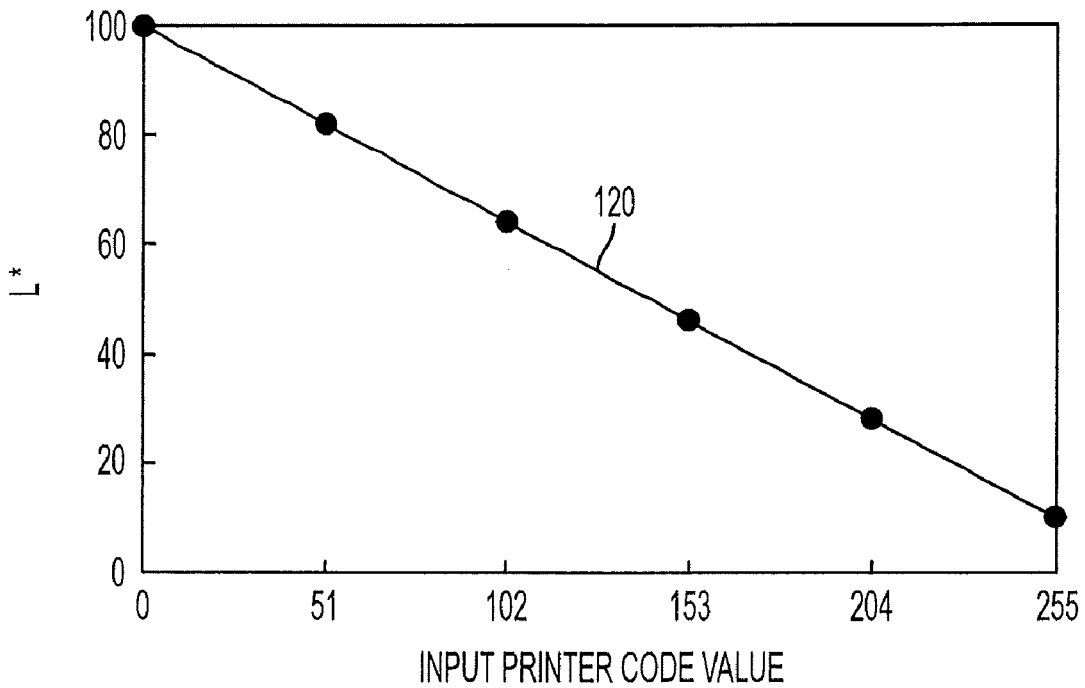
FIG. 12 shows a composite tone scale function corresponding to the method of the present invention.

The colorant control look-up tables formed according to the method of the present invention can be used in the configuration of FIG. 4. The set of colorant control look-up tables 40 are addressed by an input printer code value I(x,y) in order to determine corresponding colorant control signals $C_N(xy)$ for each of the colorants. When these colorant amounts are halftoned and the resulting halftone signals $H_N(x,y)$ are used to control the digital printer, the corresponding color channel output response (e.g., L*) can be determined. FIG. 12 shows a composite tone scale function 120 corresponding to the colorant control look-up tables shown in FIG. 11. It can be seen that the color channel output response (L*) varies smoothly with the input printer code value as expected. In this case, there is a linear relationship between the input printer code value and L*, although this is not a requirement.

Figure 13:
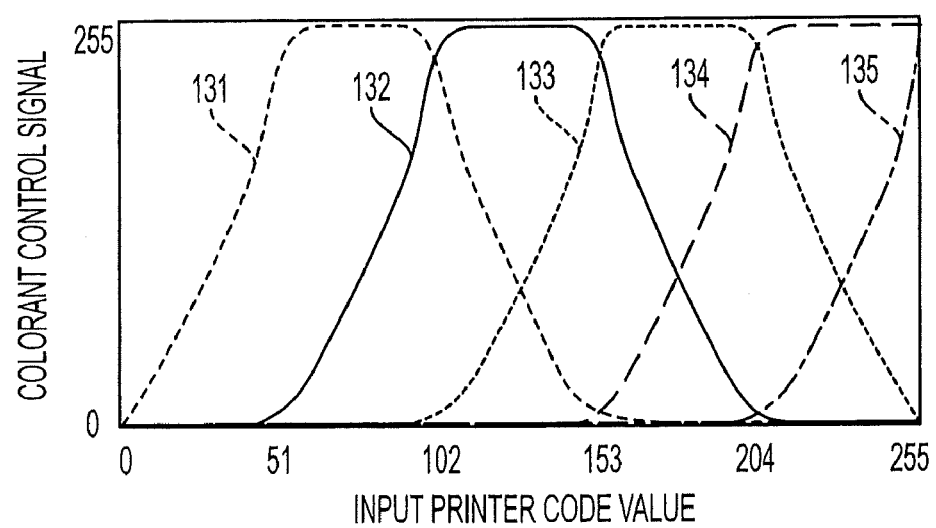
FIG. 13 shows a smoothed set of colorant control look-up tables created according to the method of the present invention.

The example colorant control look-up tables have a series of sharp corners at the node points. In some cases, there can be an advantage to smoothing out these sharp corners. An example set of smoothed colorant control look-up tables are shown in FIG. 13. A first smoothed colorant control look-up table 131 corresponds to colorant 1; a second smoothed colorant control look-up table 132 corresponds to colorant 2; a third smoothed colorant control look-up table 133 corresponds to colorant 3; a fourth smoothed colorant control look-up table 134 corresponds to colorant 4; and a fifth smoothed colorant control look-up table 135 corresponds to colorant 5. The smoothed colorant control look-up tables should be jointly designed to provide the specified tone scale aim. This shows that when the colorant level for one of the colorant control look-up tables is decreased during the smoothing process, the colorant level for one or more of the other colorant control look-up tables should be increased accordingly. Eliminating the sharp corners in the colorant control look-up tables can reduce the likelihood of producing contouring artifacts in the printed image where there are abrupt changes in the colorant concentrations or in textures associated with the halftone patterns. It should be noted that the smoothed colorant control look-up will not pass directly through the node points.

The method of the present invention can be practiced in digital printers that utilize a wide variety of halftoning methods. In a preferred embodiment of the present invention, a halftoning method is used that "decorrelates" the halftone patterns for each of the similar colorants. A characteristic of these types of halftoning algorithms is that they try to avoid putting halftone dots for the different colorants on top of each other wherever possible. Examples of halftone algorithms of this type would include the error diffusion algorithm described in U.S. Pat. No. 7,362,472, and the periodic dither halftoning algorithm described in U.S. Pat. No. 5,822,451. A variation of a periodic dither halftoning algorithm that has been specifically designed to work with sets of similar colorants is found in U.S. Patent Application Publication No. 2004/0085553. This periodic dither halftoning algorithm is particularly well suited for use in combination with the present invention.

The invention has been described in detail with particular reference to certain preferred embodiments thereof, but it will be understood that variations and modifications can be effected within the spirit and scope of the invention.

PARTS LIST

| | |
|---|---|
| 10 | colorant control look-up tables |
| 11 | light colorant control look-up table |
| 12 | dark colorant control look-up table |
| 13 | halftone light colorant step |
| 14 | halftone dark colorant step |
| 15 | print light colorant step |
| 16 | print dark colorant step |
| 20 | light colorant control look-up table |
| 21 | dark colorant control look-up table |
| 30 | light colorant control look-up table |
| 31 | dark colorant control look-up table |
| 40 | set of colorant control look-up tables |
| 42 | colorant control look-up tables |
| 44 | halftoning operations |
| 46 | print colorant steps |
| 51 | first colorant control look-up table |
| 52 | second colorant control look-up table |
| 53 | third colorant control look-up table |
| 54 | fourth colorant control look-up table |
| 55 | fifth colorant control look-up table |
| 61 | first tone scale curve |
| 62 | second tone scale curve |
| 63 | third tone scale curve |
| 64 | fourth tone scale curve |
| 65 | fifth tone scale curve |
| 70 | composite tone scale function |
| 80 | define node points step |
| 81 | node points |
| 82 | define node point aim densities step |
| 83 | node point aim densities |
| 84 | set colorant concentrations step |
| 85 | colorant concentrations |
| 86 | define tone scale aim step |
| 87 | tone scale aim |
| 88 | form colorant control look-up tables step |
| 89 | colorant control look-up tables |
| 90 | composite tone scale |
| 100 | contour lines |
| 102 | colorant control signal path |
| 111 | first colorant control look-up table |
| 112 | second colorant control look-up table |
| 113 | third colorant control look-up table |
| 114 | fourth colorant control look-up table |
| 115 | fifth colorant control look-up table |
| 120 | composite tone scale |
| 131 | first smoothed colorant control look-up table |
| 132 | second smoothed colorant control look-up table |
| 133 | third smoothed colorant control look-up table |
| 134 | fourth smoothed colorant control look-up table |
| 135 | fifth smoothed colorant control look-up table |

The invention claimed is:

1. A method for printing an input digital image having at least one color channel using a digital printer having a set of colorants, wherein two or more of the colorants in the set have substantially the same color but different densities, and printer code values for a corresponding color channel are used to control colorant amounts for the two or more colorants producing a corresponding color channel output response, comprising:
   (a) defining a sequence of node points where each of the two or more colorants are either at or near their maximum or minimum values, and where at least two colorants are at or near their maximum values for at least one of the nodes;
   (b) setting colorant concentrations for each of the two or more colorants such that the color channel output responses corresponding to the sequence of node points are substantially equally spaced in a visually uniform color space;
   (c) forming colorant control look-up tables for each of the two or more colorants, the colorant control look-up tables providing colorant control signals for controlling each of the two or more colorants as a function of the printer code value for the particular color channel, wherein the colorant control look-up tables define a nonlinear relationship between the printer code value for the particular color channel and the colorant control signals between the node points in order to provide smooth transitions in the color channel output response between the sequence of node points;
   (d) addressing the colorant control look-up tables with the printer code value for the particular color channel for each pixel of the digital image to determine the colorant control signals for each of the two or more colorants; and
   (e) controlling the digital printer using the colorant control signals for each of the two or more colorants to specify the colorant amounts for each of the two or more colorants producing a print of the input digital image.

2. The method of claim 1 where the visually uniform color space is CIELAB.

3. The method of claim 2 where the sequence of node points are substantially equally spaced in CIELAB lightness.

4. The method of claim 1 where the visually uniform color space is an optical density color space.

5. The method of claim 4 where the sequence of node points are substantially equally spaced in optical density.

6. The method of claim 1 where the colorant control look-up tables for each of the two or more colorants formed in step (c) have the characteristic that the derivative of the CIELAB lightness of the color channel output response as a function of the printer code value is continuous.

7. The method of claim 1 where the colorant control look-up tables for each of the two or more colorants formed in step (c) have the characteristic that the derivative of the CIELAB lightness of the color channel output response as a function of the printer code value is substantially constant.

8. The method of claim 1 where the colorant control look-up tables for each of the two or more colorants formed in step c) have the characteristic that the derivative of the optical density of the color channel output response as a function of the printer code value is continuous.

9. The method of claim 1 where the colorant control look-up tables for each of the two or more colorants formed in step c) have the characteristic that the derivative of the optical density of the color channel output response as a function of the printer code value is substantially constant.

10. The method of claim 1 where the two or more colorants are neutral colorants having different densities.

11. The method of claim 1 where the two or more colorants are cyan colorants having different densities.

12. The method of claim 1 where the two or more colorants are magenta colorants having different densities.

13. The method of claim 1 where the digital printer is an inkjet printer and the two or more colorants having substantially the same color but different densities are inks having different colorant concentrations.

14. The method of claim 1 where the two or more colorants are at or near their minimum levels for the first node, a first colorant is at or near its maximum level and all other colorants in the set of two or more colorants are at or near their minimum levels for a second node, the first colorant and a second colorant are at or near their maximum levels and any other colorants in the set of two or more colorants are at or near their minimum levels for a third node, and any other nodes have two colorants at or near their maximum level and any other colorants in the set of two or more colorants are at or near their minimum levels.

15. The method of claim 1 further including the step of smoothing the colorant control look-up tables for each of the two or more colorants.

* * * * *